US005818497A

United States Patent [19]

Kerr et al.

[11] Patent Number: 5,818,497

[45] Date of Patent: Oct. 6, 1998

[54] APPARATUS FOR MAGNETICALLY COUPLING A LEAD SCREW TO A PRINT HEAD

[75] Inventors: Roger S. Kerr, Brockport; Edward P. Furlani, Lancaster; Svetlana Reznik, Rochester, all of N.Y.

[73] Assignee: Eastman Kodak Company, Rochester, N.Y.

[21] Appl. No.: 816,217

[22] Filed: Mar. 12, 1997

[51] Int. Cl.[6] ................................ B41J 2/47; B41J 2/435; B41J 23/00; G01D 15/16

[52] U.S. Cl. ......................... 347/234; 347/37; 346/139 D

[58] Field of Search .............................. 347/234, 37, 232, 347/42; 318/646; 346/139 D; 400/322, 323, 317.1, 320

[56] References Cited

U.S. PATENT DOCUMENTS

| | | | |
|---|---|---|---|
| 5,036,266 | 7/1991 | Burke | 318/646 |
| 5,300,957 | 4/1994 | Burke | 347/41 |

*Primary Examiner*—N. Le
*Assistant Examiner*—Thinh Nguyen
*Attorney, Agent, or Firm*—Peyton C. Watkins

[57] ABSTRACT

An apparatus for maintaining a predetermined positional relationship of a screw, the apparatus comprises a ball bearing track having a first and second track member in a spaced apart relationship, and having a ball bearing therein for permitting rotation of the first track member with respect to the second member, and an element in a spaced apart relationship with respect to the ball bearing track for permitting the element to provide magnetic attraction between the first track member and the element.

8 Claims, 4 Drawing Sheets

APPARATUS FOR MAGNETICALLY COUPLING A LEAD SCREW TO A PRINT HEAD

BACKGROUND OF THE INVENTION

CROSS-REFERENCE TO RELATED APPLICATIONS

This application is related to U.S. application Ser. No. 08/621,417 entitled "AN APPARATUS FOR PREVENTING AXIAL MOVEMENT OF A LEAD SCREW" by Roger S. Kerr et. al.

FIELD OF THE INVENTION

This invention relates generally to the field of lathe bed scanners utilizing a rotating lead screw for permitting a print head to move along a writing medium and, more particularly, to such lead screws which are magnetically coupled to the print head so that undesirable vibrations of the lead screw are translated to the print head.

BACKGROUND OF THE INVENTION

Color-proofing is the procedure used by the printing industry for creating representative images that replicate the appearance of printed images without the cost and time required to actually set up a high-speed, high-volume printing press to print an example of the images intended. One such color proofer is a lathe bed scanner which utilizes a thermal printer having half-tone capabilities. This printer is arranged to form an image on a thermal print medium, or writing element, in which a donor transfers a dye to the thermal print medium upon a sufficient amount of thermal energy. This printer includes a plurality of diode lasers which can be individually modulated to supply energy to selected areas of the medium in accordance with an information signal. The print head of the printer includes one end of a fiber optic array having a plurality of optical fibers coupled to the diode lasers. The thermal print medium is supported on a rotatable imaging drum, and the print-head with the fiber optic array is movable relative to the longitudinal axis of the drum. The dye is transferred to the thermal print medium as the radiation, transferred from the diode lasers to the donor element by the optical fibers, is converted to thermal energy in the donor element.

For permitting relative movement of the print head, the print head is placed on a rotatable lead screw having a threaded shaft. The lead screw rests between two sides of the frame of the scanner where it is supported on both ends by bearings. At the drive end, the lead screw continues through the bearing, through a pair of spring retainers that are separated and loaded by a compression spring and to a drive motor. The drive motor induces rotation to the screw, and the compression spring functions to limit axial movement of the lead screw.

The print-head is attached to the threaded shaft of the lead screw by a drive nut which is configured to move the print head along the threaded shaft as the lead screw is rotated by the drive motor. The direction of lateral movement of the print-head is controlled by switching the direction of the rotation of the lead screw.

Although the presently known and utilized scanner is satisfactory, it is not without drawbacks. Undesirable vibrations in the lead screw or drive nut are translated to the print head causing the print head to produce artifacts on the write medium.

Consequently, a need exists for improvements in the construction of the lathe bed scanner so as to overcome the above-described drawbacks.

SUMMARY OF THE INVENTION

The present invention is directed to overcoming one or more of the problems set forth above. Briefly summarized, according to one aspect of the present invention, the invention resides in an apparatus for coupling a lead screw to a print head, the apparatus comprises (a) a nut that moves axially along the lead screw; (b) a first magnet disposed on said nut for creating a magnetic attraction; (c) a translation table on which the lead screw rests; and (d) a first pad positioned on the translation table for reciprocally attracting said magnet which coupling reduces translating undesirable movement to the print head.

It is the object of the present invention to over come the above described drawbacks.

It is a feature of the present invention to magnetically couple the print head and lead screw.

It is an advantage of the present invention to provide a convenient and inexpensive method for coupling the print head and lead screw.

The above and other objects of the present invention will become apparent when taken in conjunction with the following description and drawings wherein identical reference numerals have been used, where possible, to designate identical elements that are common to the figures.

DETAILED DESCRIPTION OF THE INVENTION

Figure 1:
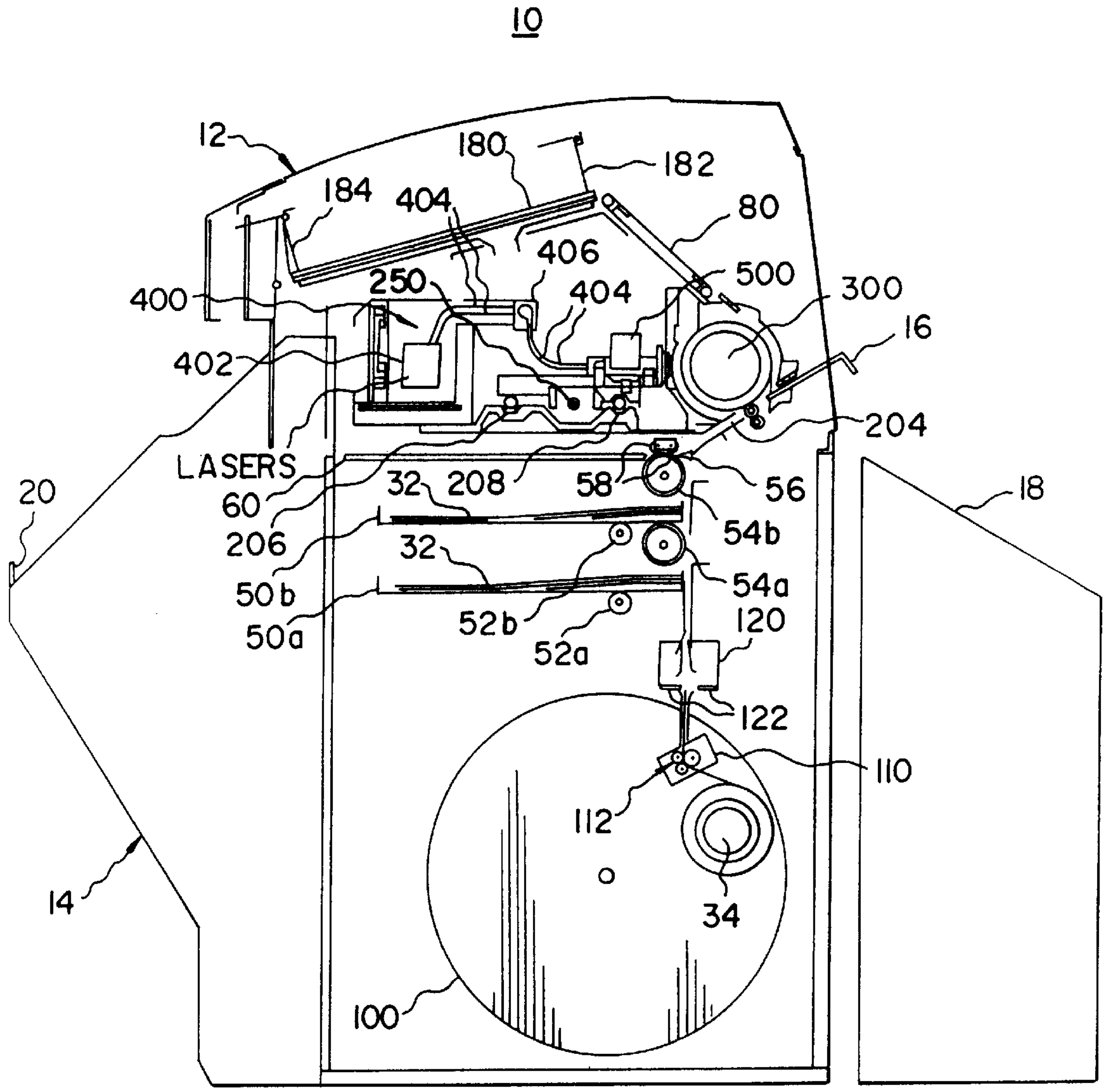
FIG. 1 is a side view in vertical cross section of an image processing apparatus of the present invention.

Referring to FIG. 1, there is illustrated an image processing apparatus 10 according to the present invention having an image processor housing 12 for forming a protective cover. A movable, hinged image processor door 14 is attached to the front portion of the image processor housing 12 for permitting access to two sheet material trays, lower sheet material tray 50*a* and upper sheet material tray 50*b*, that are positioned in the interior portion of the image processor housing 12 for supporting thermal print media 32 thereon. It will be obvious to those skilled in the art that only one of the sheet material trays 50 will dispense the thermal print media 32 out of its sheet material tray 50 to create an intended image thereon; the alternate sheet material tray 50 either holds an alternative type of thermal print media 32 or functions as a back up. In this regard, the lower sheet material tray 50*a* includes a lower media lift cam 52*a* for lifting the lower sheet material tray 50*a* and ultimately the thermal print media 32 upwardly toward a rotatable, lower media roller 54*a* and, ultimately, toward a second rotatable, upper media roller 54*b* which, when both are rotated, permit the thermal print media 32 to be pulled upwardly towards a media guide 56. The upper sheet material tray 50*b* includes a upper media lift cam 52*b* for lifting the upper sheet material tray 50*b* and ultimately the thermal print media 32 thereon towards the upper media roller 54*b* which directs it towards the media guide 56.

The movable media guide 56 directs the thermal print media 32 under a pair of media guide rollers 58 which engages the thermal print media 32 for assisting the upper media roller 54*b* in directing it onto the media staging tray 60. The media guide 56 is attached and hinged to the interior of the housing 12 at one end, and is uninhibited at its other end for permitting multiple positioning of the media guide 56. The media guide 56 then rotates its uninhibited end downwardly, as illustrated in the position shown, and the direction of rotation of the upper media roller 54*b* is reversed for forcing the thermal print medium receiver sheet material 32 resting on the media staging tray 60 under the pair of media guide rollers 58, upwardly through an entrance passageway 204 and around a rotatable vacuum imaging drum 300.

A roll of dye donor material 34 is connected to a media carousel 100 in a lower portion of the image processor housing 12. Four rolls are used, but only one is shown for clarity. Each roll includes a dye donor material 34 of a different color, typically black, yellow, magenta and cyan. These dye donor materials 34 are ultimately cut into dye donor sheet materials and passed to the vacuum imaging drum 300 for forming the medium from which dyes imbedded therein are passed to the thermal print media 32 resting thereon, which process is described in detail herein below. In this regard, a media drive mechanism 110 is attached to each roll of dye donor material 34, and includes three media drive rollers 112 through which the dye donor material 34 of interest is metered upwardly into a media knife assembly 120. After the dye donor material 34 reaches a predetermined position, the media drive rollers 112 cease driving the dye donor material 34 and two media knife blades 122 positioned at the bottom portion of the media knife assembly 120 cut the dye donor material 34 into dye donor sheet materials. The media rollers 54 and media guide 56 then pass the dye donor sheet material onto the media staging tray 60 and ultimately to the vacuum imaging drum 300 and in registration with the thermal print media 32 using the same process as described above for passing the thermal print media 32 onto the vacuum imaging drum 300. The dye donor sheet material now rests atop the thermal print media 32 with a narrow gap between the two created by microbeads imbedded into the thermal print media 32.

A laser assembly 400 includes a quantity of laser diodes 402 in its interior portion, and these lasers 402 are connected via fiber optic cables 404 to a distribution block 406 and ultimately to the printhead 500. The printhead 500 directs thermal energy received from the laser diodes 402 for causing the dye donor sheet material to pass the desired color of dye across the gap to the thermal print media 32. The printhead 500 is attached to a lead screw 250 via a lead screw drive nut 254 (not shown in FIG. 1) for permitting movement axially along the longitudinal axis of the vacuum imaging drum 300 for transferring the data to create the intended image onto the thermal print media 32.

For writing, the vacuum imaging drum 300 rotates at a constant velocity, and the printhead 500 begins at one end of the thermal print media 32 and traverses the entire length of the thermal print media 32 for completing the transfer process for the particular dye donor sheet material 36 resting on the thermal print media 32. After the printhead 500 has completed the transfer process, the particular dye donor sheet material resting on the thermal print media 32 is then removed from the vacuum imaging drum 300 and transferred out the image processor housing 12 via a skive or ejection chute 16. The dye donor sheet material eventually comes to rest in a waste bin 18 for removal by the user. The above described process is then repeated for the other three rolls 30 of dye donor materials 34.

After the color from all four sheets of the dye donor sheet materials 36 have been transferred, the thermal print media 32 is transported via a transport mechanism 80 through an entrance door 182 to a color binding assembly 180. The entrance door 182 is opened for permitting the thermal print media 32 to enter the color binding assembly 180, and shuts once the thermal print media 32 comes to rest in the color binding assembly 180. The color binding assembly 180 processes the thermal print media 32 for further binding the transferred colors on the thermal print media 32 and for sealing the microbeads thereon. After the color binding process has been completed, a media exit door 184 is opened and the thermal print media 32 with the intended image thereon passes out of the color binding assembly 180 and the image processor housing 12 and comes to rest against a media stop 20.

Figure 2:
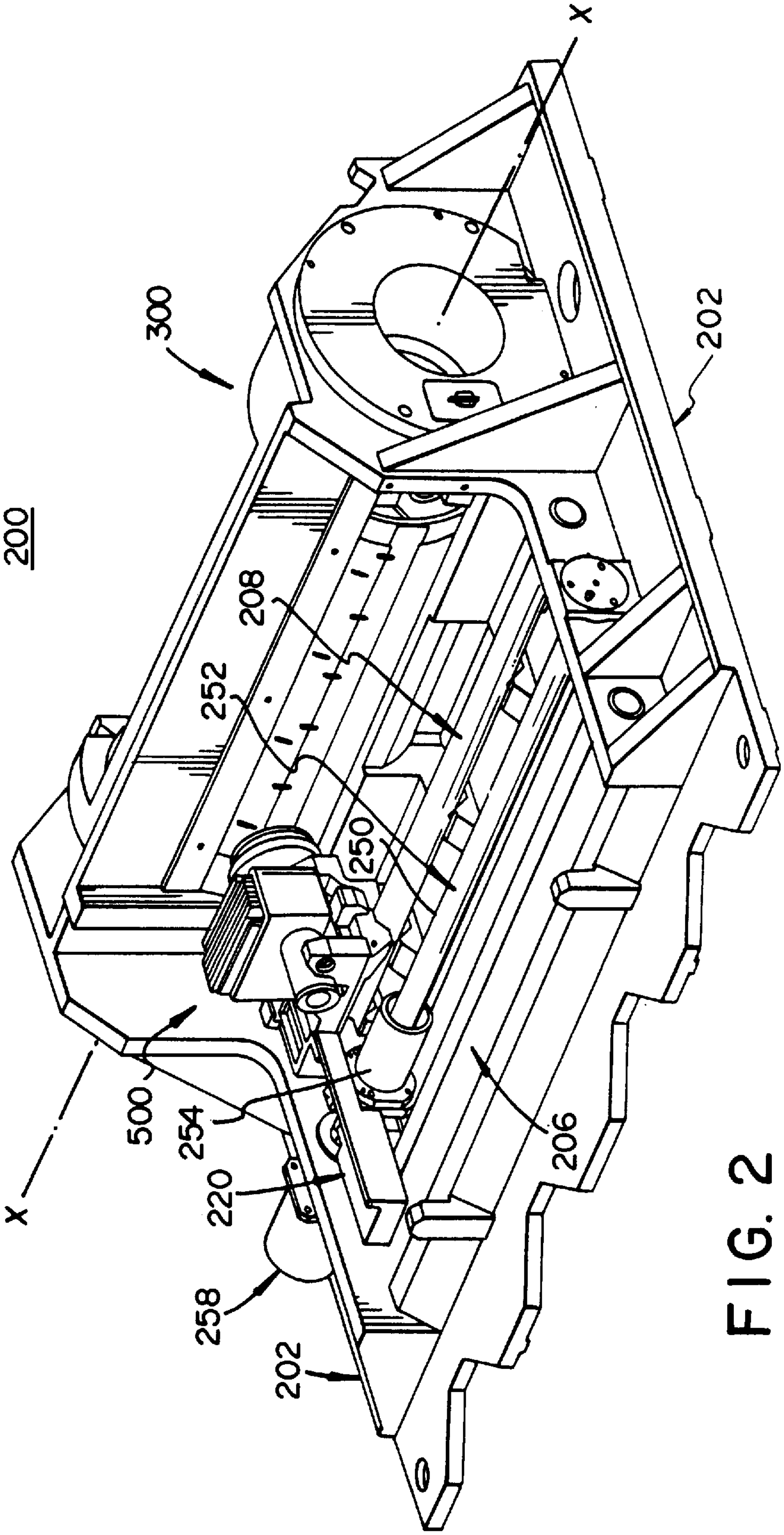
FIG. 2 is a perspective view of the lathe bed scanning subsystem or write engine of the present invention.

Referring to FIG. 2, there is illustrated a perspective view of the lathe bed scanning subsystem 200 of the image processing apparatus 10, including the vacuum imaging drum 300, printhead 500 and lead screw 250 assembled in the lathe bed scanning frame 202. The vacuum imaging drum 300 is mounted for rotation about an axis X in the lathe bed scanning frame 202. The printhead 500 is movable with respect to the vacuum imaging drum 300, and is arranged to direct a beam of light to the dye donor sheet material (shown in FIG. 1). The beam of light from the printhead 500 for each laser diode 402 (not shown in FIG. 2) is modulated individually by modulated electronic signals from the image processing apparatus 10, which signals are representative of the shape and color of the original image, so that the color on the dye donor sheet material 36 is heated to cause volatilization only in those areas in which its presence is required on the thermal print media 32 to reconstruct the shape and color of the original image.

The printhead 500 is mounted on a movable translation stage member 220 which, in turn, is supported for low friction slidable movement on translation bearing rods 206 and 208. The translation bearing rods 206 and 208 are sufficiently rigid so that they do not sag or distort between their mounting points and are arranged as parallel as possible with the axis X of the vacuum imaging drum 300 with the axis of the printhead 500 perpendicular to the axis X of the vacuum imaging drum 300 axis. The front translation bearing rod 208 locates the translation stage member 220 in the vertical and the horizontal directions with respect to axis X of the vacuum imaging drum 300. The rear translation bearing rod 206 locates the translation stage member 220 only with respect to rotation the translation stage member 220 about the front translation bearing rod 208 so that there is no over-constraint condition of the translation stage member 220 which might cause it to bind, chatter, or otherwise impart undesirable vibration or jitters to the printhead 500 during the generation of an intended image.

Figure 3:
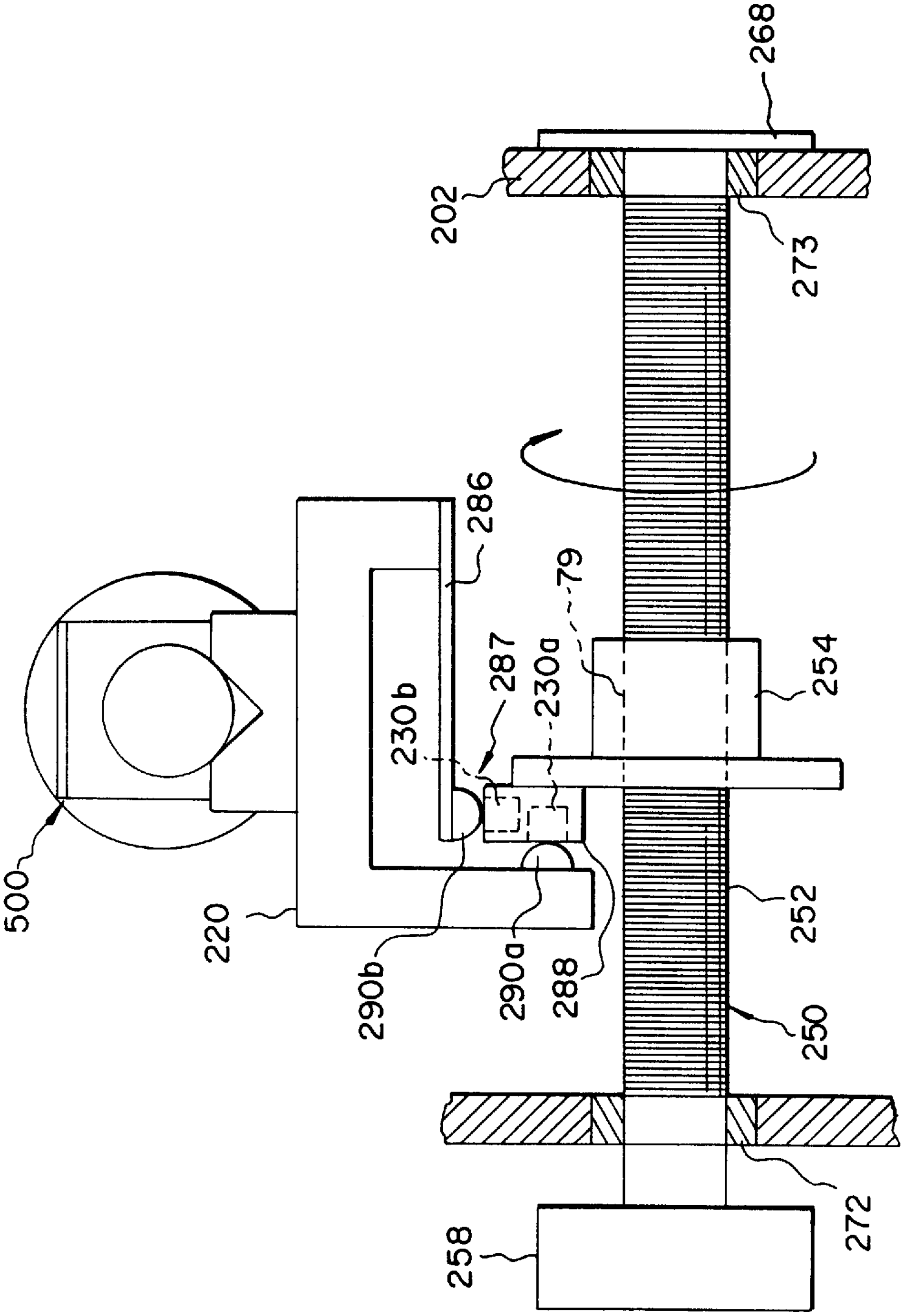
FIG. 3 is a side view of the write engine's lead screw of the present invention.

Referring to FIGS. 2 and 3, the lead screw 250 includes an elongated, threaded shaft 252 which is attached to a linear drive motor 258 on its drive end and to the lathe bed scanning frame 202 via a ball bearing assembly 273 on its other end. The drive nut 254 includes grooves in its hollowed-out center portion 70 for mating with the threads of the threaded shaft 252 for permitting the lead screw drive nut 254 to move axially along the threaded shaft as the threaded shaft is rotated by the linear drive motor 258. The drive nut 254 is integrally attached to the to the printhead 500 through a magnetic assembly 287 so that as the threaded shaft 252 is rotated by the linear drive motor 258 the lead screw drive nut 254 moves axially along the threaded shaft 252 which in turn moves the translation stage member 220 and ultimately the printhead 500 axially along the vacuum imaging drum 300.

Figure 4:
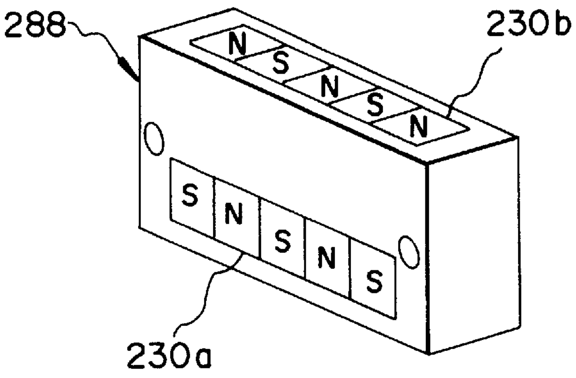
FIG. 4 is a perspective view of a magnetic assembly of the present invention.

Referring to FIGS. 3 and 4, the magnetic assembly 287 includes a magnet mounting block 288 for receiving two screw coupling magnets 230 therein. The magnetic mounting block 288 is attached to the drive nut 254 via two screws (not shown). Each magnet 230 includes a plurality of alternating north and south poles on its surface for attaching mounting pads 290 that are attached to the translation stage member 220 for ultimately maintaining the positional relationship of the lead screw drive nut 254 relative to the translation stage member 220, as will be described in detail below. It is instructive to note that the poles, although shown as alternating, may be of the same polarity, as will be recognized by those skilled in the art. The translation stage member 220 includes a ferromagnetic mounting pad 290*a* integrally attached thereto for reciprocally attracting the magnets 230*a*. A rotational stop flexure 286 is attached to the translation stage member 220 and includes another mounting pad 290 thereon which functions to reciprocally attract the magnet 230*b* It facilitates understanding to note that rotation of the drive nut 254 typically produces undesirable movement of the translation stage member 220 due to any runout of the lead screw 250, and the flexure 286 functions to provide a rotational constraint of the drive nut 254 for consequently preventing this undesirable movement.

The movement of the print head 500 operates as follows. The linear drive motor 258 is energized and imparts rotation to the lead screw 250 as indicated by the arrows, causing the lead screw drive nut 254 to move axially along the threaded shaft 252. The magnetic assembly 287 functions to prevents undesirable movements of the lead screw drive nut 254 from being translated to the translation stage member 220 and ultimately the print head 500.

Figure 5:
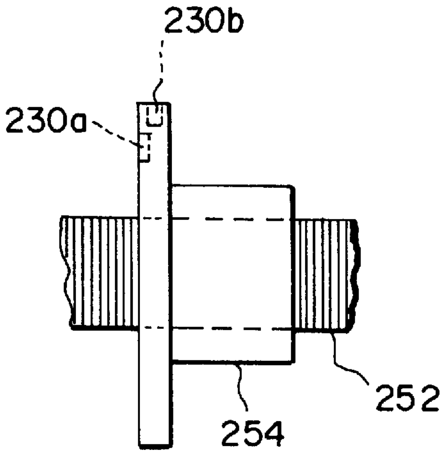
FIG. 5 is an alternative embodiment of a portion of FIG. 4.

Referring to FIG. 5, an alternative embodiment of the present invention is illustrated. In this regard, the magnets 230 are inserted directly into the drive nut 254 and the mounting pads 290 are respectively placed over the portion of the drive nut 254 containing the magnets 230.

The invention has been described with reference to the preferred embodiment thereof. However, it will be appreciated and understood that variations and modifications can be effected within the spirit and scope of the invention as described herein above and as defined in the appended claims. by a person of ordinary skill in the art without departing from the scope of the invention.

Parts List

10 Image processing apparatus
12 Image processor housing
14 Image processor door
16 Donor ejection chute
18 Donor waste bin
20 Media stop
32 Thermal print media
34 Dye donor roll material
50 Sheet material trays
50*a* Lower sheet material tray
50*b* Upper sheet material tray
52 Media lift cams
52*a* Lower media lift cam
52*b* Upper media lilt cam
54 Media rollers
54*a* Lower media roller
54*b* Upper media roller
56 Media guide
58 Media guide rollers
60 Media staging tray
80 Transport mechanism
100 Media carousel
110 Media drive mechanism
112 Media drive rollers
120 Media knife assembly
122 Media knife blades
180 Color binding assembly
182 Media entrance door
184 Media exit door
200 Lathe bed scanning subsystem
202 Lathe bed scanning frame
204 Entrance passageway
206 Rear translation bearing rod
208 Front translation bearing rod
220 Translation stage member
250 Lead screw
252 Threaded shaft
254 Lead screw drive nut
258 Linear drive motor
260 Axial load magnets
260 Axial load magnet
260*b* Axial load magnet
266 Circular-shaped boss
268 Ball
266 Circular-shaped insert
268 End cap
270 Hollowed-out center portion
272 Radial ball bearing
274 Inner bearing race
276 Outer bearing race
278 Bearing ball
280 Preload member
282 Inner preload spacer
284 Outer preload spacer
300 Vacuum imaging drum
302 Vacuum drum housing
306 Vacuum hole Parts List (cont'd)

332 Vacuum grooves
344 Drum encoder
400 Laser assembly
402 Lasers diode
404 Fiber optic cables
406 Distribution block
450 Writing swath
500 Printhead

We claim:

1. An apparatus for coupling a lead screw to a print head, the apparatus comprising
   (a) a nut that moves axially along the lead screw;
   (b) a magnet disposed on or in said nut for creating a magnetic attraction;
   (c) a translation table disposed on said nut; and
   (d) a pad disposed on the translation table for reciprocally attracting said magnet which coupling reduces translating undesirable movement to the print head.

2. The apparatus as in claim 1, wherein said pad is ferromagnetic.

3. The apparatus as in claim 2, wherein said magnet is a permanent magnet.

4. The apparatus as in claim 3 further comprising another magnet disposed on said nut and another pad disposed on said table which reciprocally attract each other for further coupling the lead screw and print head.

5. The apparatus as in claim 4 further comprising a retaining element in which the magnet and the other magnet are disposed.

6. The apparatus as in claim 5, wherein said nut includes grooves in an interior portion for permitting said nut to move axially along the lead screw.

7. The apparatus as in claim 4, wherein said magnet and said another magnet are disposed in a lip portion of said nut.

8. The apparatus as in claim 7, wherein said nut includes grooves in its interior portion for permitting said nut to move axially along the lead screw.

* * * * *